(12) United States Patent
Barr et al.

(10) Patent No.: US 9,742,197 B2
(45) Date of Patent: Aug. 22, 2017

(54) POWER DISTRIBUTION ALGORITHM

(75) Inventors: Jordi McGregor Barr, Bristol (GB);
Andrew Peter Henry McCabe,
Wotton-Under-Edge (GB)

(73) Assignee: BAE SYSTEMS plc, London (GB)

( * ) Notice: Subject to any disclaimer, the term of this patent is extended or adjusted under 35 U.S.C. 154(b) by 402 days.

(21) Appl. No.: 14/343,638

(22) PCT Filed: Sep. 12, 2012

(86) PCT No.: PCT/GB2012/052247
§ 371 (c)(1),
(2), (4) Date: Mar. 7, 2014

(87) PCT Pub. No.: WO2013/038173
PCT Pub. Date: Mar. 21, 2013

(65) Prior Publication Data
US 2014/0207303 A1   Jul. 24, 2014

(30) Foreign Application Priority Data
Sep. 14, 2011  (GB) .................................. 1115871.4

(51) Int. Cl.
*G05D 3/12* (2006.01)
*H02J 4/00* (2006.01)
(Continued)

(52) U.S. Cl.
CPC .............. *H02J 4/00* (2013.01); *H02J 3/008* (2013.01); *H02J 3/46* (2013.01); *Y02P 80/11* (2015.11); *Y04S 10/54* (2013.01); *Y04S 50/10* (2013.01)

(58) Field of Classification Search
CPC ....... H02J 3/14; H02J 3/28; H02J 3/00; Y02E 40/72
See application file for complete search history.

(56) References Cited

U.S. PATENT DOCUMENTS 5,185,715 A   2/1993  Zikan et al.
6,882,904 B1   4/2005  Petrie et al.
(Continued)

FOREIGN PATENT DOCUMENTS

DE   102009003173 A1   11/2010
EP       0573140 A2   12/1993
(Continued)

OTHER PUBLICATIONS

International Search Report and The Written Opinion received for Patent Application No. PCT/GB2012/052247, mailed on Jan. 9, 2013, 12 pages.
(Continued)

*Primary Examiner* — Darrin Dunn
(74) *Attorney, Agent, or Firm* — Finch & Maloney PLLC

(57) ABSTRACT

A method and apparatus for distributing power through a network (1), the network comprising consumer units (C1-C4) and provider units (P1-P6), the method comprising: for each provider unit (P1-P6), allocating some production capacity of that provider unit (P1-P6) to each consumer units (C1-C4) to which that provider unit (P1-P6) is connected, performing one or more times a process of performing steps (a) to (c); wherein step (a) comprises, for each consumer unit (C1-C4), generating a vector of resource requests, step (b) comprises, for each provider unit (P1-P6), determining whether it currently satisfies the requests made of it; and step (c) comprises, for each provider unit (P1-P6) which does not currently satisfy the requests made of it, updating the current production allocation; and from each provider unit (P1-P6) and dependant on the current production allocation of that provider unit (P1-P6), delivering to a consumer unit (C1-C4) an amount of resource.

16 Claims, 4 Drawing Sheets

(51) Int. Cl.
*H02J 3/00* (2006.01)
*H02J 3/46* (2006.01)

(56) References Cited

U.S. PATENT DOCUMENTS

| | | | | |
|---|---|---|---|---|
| 7,313,465 B1* | 12/2007 | O'Donnell | ............ | G06Q 50/06 323/237 |
| 8,571,720 B2* | 10/2013 | Yonezawa | ................ | H02J 3/14 700/291 |
| 8,825,218 B2* | 9/2014 | Cherian | .................... | H02J 3/00 700/291 |
| 2002/0192516 A1* | 12/2002 | Tajima | ................... | G06Q 10/06 700/286 |
| 2003/0041002 A1 | 2/2003 | Hao et al. | | |
| 2004/0158360 A1* | 8/2004 | Garland, II | ............ | G06Q 50/06 700/286 |
| 2010/0298998 A1* | 11/2010 | Hamilton, II | ............. | G06F 1/30 700/295 |
| 2010/0306097 A1 | 12/2010 | Greiner et al. | | |
| 2011/0071699 A1 | 3/2011 | Kim et al. | | |
| 2011/0276194 A1* | 11/2011 | Emalfarb | ............ | B60L 11/1838 700/297 |
| 2012/0059532 A1* | 3/2012 | Reifenhauser | ............ | H02J 3/00 700/297 |
| 2012/0209442 A1* | 8/2012 | Ree | .................... | H04L 12/2803 700/295 |
| 2012/0330473 A1* | 12/2012 | Meredith | ................... | H02J 3/14 700/291 |
| 2013/0166085 A1* | 6/2013 | Cherian | ................ | G05B 13/02 700/291 |
| 2014/0236374 A1 | 8/2014 | Barr et al. | | |

FOREIGN PATENT DOCUMENTS

| | | |
|---|---|---|
| EP | 2290779 A1 | 3/2011 |
| GB | 2376087 A | 12/2002 |
| WO | 2004093286 A1 | 10/2004 |
| WO | 2009083640 A2 | 7/2009 |
| WO | 2011091857 A1 | 8/2011 |
| WO | 2013038173 A1 | 3/2013 |
| WO | 2013038174 A1 | 3/2013 |

OTHER PUBLICATIONS

GB Intellectual Property Office Search Report under Section 17(5) received for GB Patent Application No. 1115871.4 date of search Feb. 7, 2012, 3 pages.
International Preliminary Report on Patentability and Written Opinion of the International Searching Authority received for Patent Application No. PCT/GB2012/052247, mailed on Mar. 27, 2014, 8 pages.
International Preliminary Report on Patentability and Written Opinion of The International Searching Authority received for Patent Application No. PCT/GB2012/052248, mailed on Mar. 27, 2014, 8 pages.
International Search Report received for Patent Application No. PCT/GB2012/052248, mailed on Jan. 22, 2013, 4 pages.
GB Intellectual Property Office Search Report under Section 17(5) received for GB Patent Application No. 1115872.2 date of search Feb. 7, 2012, 3 pages.
Ahuja, et al., "Network Flows, Theory, Algorithms, and Applications," published by Prentice-Hall, 1993. 863 pages.
Ter-Gazarian, et al., "Design model for electrical distribution systems considering renewable, conventional and energy storage units," IEE Proceedings C, vol. 139, No. 6, Nov. 1992. pp. 499-504.
Cvijic, et al., "On Limits to the Graph-Theoretic Approaches in the Electric Power Systems," North American Power Symposium (NAPS), Aug. 4-6, 2011. pp. 1-6.
Marinescu, et al., "From Microgrids to Smart Grids: Modeling and Simulating using Graphs. Part II Optimization of Reactive Power Flow," 12th International Conference on Optimization of Electrical and Electronic Equipment, OPTIM, 2010, pp. 1251-1256.
Quelhas, et al., "A Multiperiod Generalized Network Flow Model of the U.S. Integrated Energy System: Part I—Model Description," IEEE Transactions on Power Systems, vol. 22. No. 2, May 2007. pp. 829-836.
Zhu, Jizhong, "Security-Constrained Economic Dispatch," Optimization of Power System Operation, Chapter 5, Dec. 31, 2009. pp. 141-210.
Nguyen et al., "Distributed routing algorithms to manage power flow in agent-based active distribution network" IEEE PES Inovative Smart Grid Technologies Conference Europe (ISGT Europe), Oct. 11-13, 2010, 7 pgs.

* cited by examiner

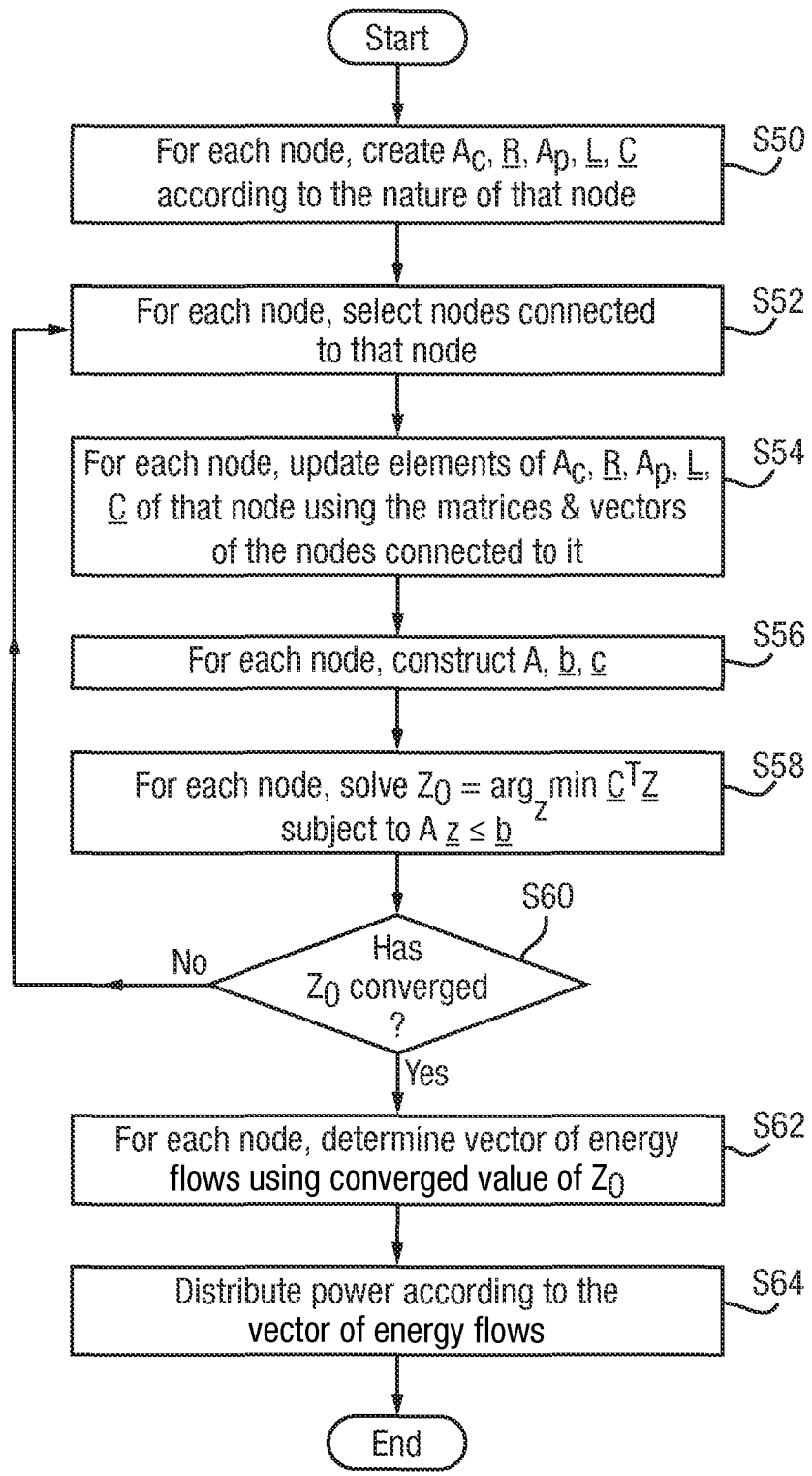

POWER DISTRIBUTION ALGORITHM

FIELD OF THE INVENTION

The present invention relates to distribution of a resource, in particular electrical power, through a network.

BACKGROUND

Energy and Power Management (E&PM) processes have been developed to increase the energy efficiency of sites (e.g. a military base or industrial location) that are connected to a power grid (e.g. the national grid), but have one or more on-site sources of power (e.g. a source of renewable power).

A goal of such processes is that of minimising a cost of power taken from both the power grid to which the site is connected, and the on-site resources.

A problem of distributing power in a network may be treated as a Linear Programming Problem.

A centralized solution to Linear Programming Problems is described in "*Linear Programming and Extensions*", Dantzig G. B. 1963, Princeton, N.J.: Princeton University Press.

However, when a network becomes large, centralised E&PM tends to become difficult.

The case for addressing resource optimisation problems using a decentralised approach is discussed in "*Information Theory, Inference and Learning Algorithms*", McKay, D. J. C. 2003, Cambridge University Press, 241-247. Such decentralised approaches tend to be advantageously robust and scalable.

SUMMARY OF THE INVENTION

In a first aspect, the present invention provides a method of distributing a resource through a network, the resource being electrical power, the network comprising a plurality of consumer units and a plurality of provider units, each consumer unit being connected to one or more provider units in the network, each consumer unit being a user of the resource and being associated with a desired resource amount, each provider unit being a provider of the resource and being associated with a resource production capacity, the method comprising: for each provider unit, allocating a portion of the resource production capacity of that provider unit to each of the consumer units to which that provider unit is connected, thereby providing a current production allocation for each provider unit; performing one or more times a process, the process being a process of performing steps (a) to (c); step (a) comprises, for each consumer unit, generating a vector comprising one or more resource requests, thereby providing a current vector for each consumer unit, each resource request being a request for an amount of resource to be delivered to that consumer unit from a provider unit connected to that consumer unit, and each resource request being dependent on the current production allocation of that provider unit; step (b) comprises, for each provider unit, determining whether the current production allocation of that provider unit satisfies the requests made of that provider unit in each of the current vectors; and step (c) comprises, for each provider unit for which it is determined that the current production allocation does not satisfy the requests made of that provider unit in each of the current vectors, updating the current production allocation for that provider unit; and from each provider unit and dependant on the current production allocation of that provider unit, delivering to a consumer unit connected to that provider unit an amount of resource.

The method steps (a) to (c) may be performed until, at step (c), it is determined that, for each provider unit, the current production allocation of that provider unit satisfies the requests made of that provider unit in each of the current vectors.

A resource request for a consumer unit may be further dependent on the desired resource amount of that consumer unit.

The step of, for each consumer unit, generating a current vector may comprise performing (one or more times) the method steps (d) to (e), wherein step (d) comprises selecting a previously unselected provider unit that is connected to that consumer unit, thereby providing a currently selected provider unit, and step (e) comprises generating a resource request, the generated resource request being a request for an amount of resource to be delivered to that consumer unit from the currently selected provider unit.

An amount of resource specified in the resource request generated at step (d) may be substantially equal to a minimum of a first value and a second value, wherein the first value is the resource production capacity of the currently selected provider unit that is allocated to that consumer unit, and the second value is a difference between the desired resource amount associated with that consumer unit and a total amount specified by all other resource requests in the current vector.

Each provider unit may be associated with a cost of providing the resource, and step (d) may comprise selecting a previously unselected provider unit that is connected to that consumer unit, thereby providing a currently selected provider unit, the currently selected provider unit being associated with a lowest cost of the costs associated with the previously unselected provider units that are connected to that consumer unit.

Step (a) may further comprise, for each provider unit, sending to each of the consumer units to which that provider unit is connected, an indication of the resource production capacity allocated to that consumer unit by that provider unit.

Step (b) may further comprise, for each consumer unit, sending to each of the provider units to which that consumer unit is connected, the current vector determined for that consumer unit.

One or the provider units in the plurality of provider units may be an electrical energy grid.

One or more provider units in the plurality of provider units may be a renewable energy source.

In a further aspect the present invention provides a method of distributing a resource through a network during a time period, the time period comprising a plurality of time-steps, the method comprising, at one or more of the time steps, performing a method according to the above aspect.

The method may further comprise, at any of the time steps, performing one or more times a first process, the first process being a process of performing step (f) followed by step (g); wherein step (f) comprises selecting a previously unselected consumer unit from the plurality of consumer units, thereby providing a currently selected consumer unit; step (g) comprises performing one or more times a second process, the second process being a process of performing (h) followed by step (i); step (h) comprises selecting a previously unselected provider unit from the plurality of provider units thereby providing a currently selected provider unit, the currently selected provider unit being connected in the network to the currently selected consumer unit; and step (i) comprises, from the currently selected provider unit to the currently selected consumer unit, delivering an amount of resource, the amount of resource being substantially equal to a minimum of a first value and a second value; the first value is the resource production limit associated with the currently selected provider unit; and the second value is a difference between desired resource amount associated with the currently selected consumer unit and a total amount of resource previously delivered to the currently selected consumer unit.

The method may further comprise, at any of the time steps, for each node in the network, generating one or more vectors and/or matrices indicative of the desired resource amount or the resource production capacity associated with that node, thereby providing a current set of matrices and/or vectors for each node; performing one or more times a process, the process being a process of performing steps (j) to (l); step (j) comprises, for each node, selecting the nodes in the network that are connected to that node; step (k) comprises, for each node, updating the current set of matrices and/or vectors for that node using the current set of matrices and/or vectors for each selected node that is connected to that node; and step (l) comprises, for each node, calculating a vector of flows, each element in the vector of flows representing a flow of an amount of resource between nodes in the network, and the vector of flows being calculated such that the desired resource amounts of the consumer units and the resource production capacities of the provider units are satisfied; and delivering from a provider unit to a consumer unit connected to that provider unit, an amount of resource dependent on a vector of flows.

In a further aspect, the present invention provides apparatus for distributing a resource through a network, the resource being electrical power, the network comprising a plurality of consumer units and a plurality of provider units, each consumer unit being connected to one or more provider units in the network, each consumer unit being a user of the resource and being associated with a desired resource amount, each provider unit being a provider of the resource and being associated with a resource production capacity, the apparatus comprising: one or more processors arranged to, for each provider unit, allocate a portion of the resource production capacity of that provider unit to each of the consumer units to which that provider unit is connected, thereby providing a current production allocation for each provider unit; one or more times, perform the method steps (a) to (c); wherein step (a) comprises, for each consumer unit, generating a vector comprising one or more resource requests, thereby providing a current vector for each consumer unit, each resource request being a request for an amount of resource to be delivered to that consumer unit from a provider unit connected to that consumer unit, and each resource request being dependent on the current production allocation of that provider unit; step (b) comprises, for each provider unit, determining whether the current production allocation of that provider unit satisfies the requests made of that provider unit in each of the current vectors; and step (c) comprises, for each provider unit for which it is determined that the current production allocation does not satisfy the requests made of that provider unit in each of the current vectors, updating the current production allocation for that provider unit; and delivery means for, from each provider unit and dependant on the current production allocation of that provider unit, delivering to a consumer unit connected to that provider unit an amount of resource.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

BRIEF DESCRIPTION OF THE DRAWINGS

FIG. 4 is process flowchart showing certain steps of a second example of an energy distribution algorithm used to distribute energy throughout the network.

DETAILED DESCRIPTION

Figure 1:
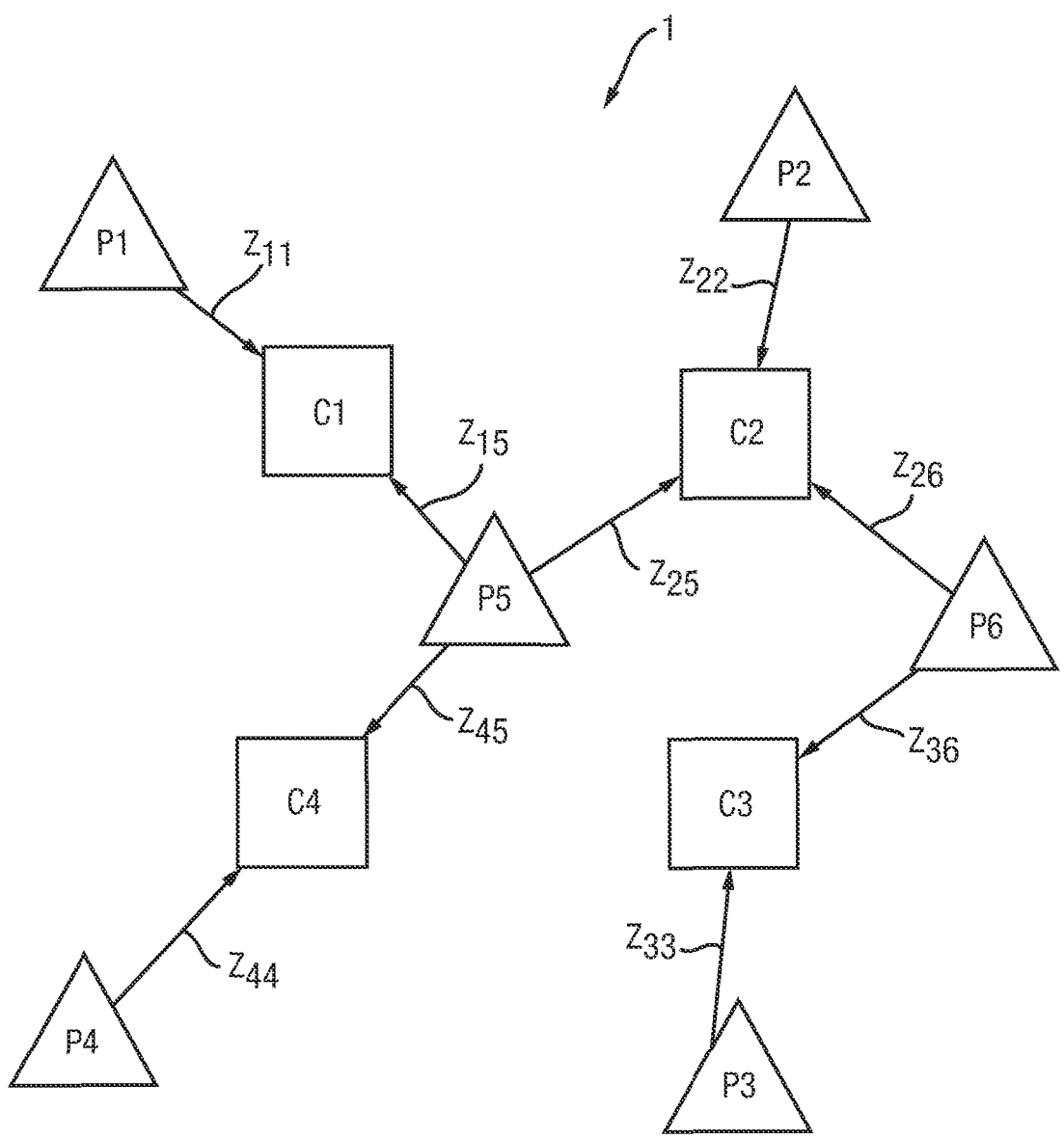
FIG. 1 is a schematic illustration (not to scale) of an example of a network comprising energy consumers and energy producers.

FIG. 1 is a schematic illustration (not to scale) of an example of a network 1 comprising energy consumers and energy producers, for which an embodiment of an energy distribution algorithm will be implemented, as described in more detail later below with reference to FIG. 2.

In this example, the network 1 comprises four energy consumer units, hereinafter referred to as consumers.

In FIG. 1, a first consumer is indicated by a square and the reference numeral C1, a second consumer is indicated by a square and the reference numeral C2, a third consumer is indicated by a square and the reference numeral C3, and a fourth consumer is indicated by a square and the reference numeral C4.

In this example, the network 1 comprises six units for producing, or providing energy, hereinafter referred to as producers.

In FIG. 1, a first producer is indicated by a square and the reference numeral P1, a second producer is indicated by a square and the reference numeral P2, a third producer is indicated by a square and the reference numeral P3, a fourth producer is indicated by a square and the reference numeral P4, a fifth producer is indicated by a square and the reference numeral P5, and a sixth producer is indicated by a square and the reference numeral P6.

The terminology "energy" is used herein to refer to electrical energy or power. However, in other embodiments a different resource may be distributed throughout the network.

In other examples, the producers P1-P6 and the consumers C1-C4 produce/consume a different type of resource instead of or in addition to electrical energy, for example water. In such cases, the below described embodiments of an energy distribution algorithm will be used to distribute this different type of resource instead of or in addition to electrical energy.

In this example, each of the producers P1-P6 comprises a generator (e.g. a diesel generator, a wind turbine, or a solar panel) and an engine management system. The engine management system of a producer P1-P6 controls the speed at which the corresponding diesel generator is run. The engine management system of a producer P1-P6 increases or decreases the fuel supply to the corresponding diesel generator as an electrical load increases or decreases in order to maintain a target speed.

In other examples, one or more of the producers P1-P6 is a different type of energy producer, e.g. a wind turbine, a solar panel (for producing electricity or heating water directly), a gas turbine generator, a gas combined heat and power (CHP) generator, a combined cycle gas turbine CHP generator, a biomass CHP generator, a heat pump (ground sourced or air sourced), a hydro-electric generator, or the National Grid.

In this example, each of the consumers C1-C4 is a building. Also, each of the consumers has a different energy requirement to each of the other consumers. For example, a consumer C1-C4 may be a barracks, an office, a hanger, a canteen, a mess hall, or a radar station, or any other appropriate building.

In other examples, one or more of the consumers C1-C4 is a different type of consumer.

The notation $z_{ij}$ is used herein to indicate a flow rate from the jth producer to the ith consumer.

The terminology "connected" is used herein to refer to two nodes of the network 1 that are directly connected by a single flow.

In this example, the first producer P1 is connected to the first consumer C1 such that energy may flow from the first producer P1 to the first consumer C1. This flow of energy is indicated in FIG. 1 by a sold arrow and the reference numeral $z_{11}$.

In this example, the second producer P2 is connected to the second consumer C2 such that energy may flow from the second producer P2 to the second consumer C2. This flow of energy is indicated in FIG. 1 by a sold arrow and the reference numeral $z_{22}$.

In this example, the third producer P3 is connected to the third consumer C3 such that energy may flow from the third producer P3 to the third consumer C3. This flow of energy is indicated in FIG. 1 by a sold arrow and the reference numeral $z_{33}$.

In this example, the fourth producer P4 is connected to the fourth consumer C4 such that energy may flow from the fourth producer P4 to the fourth consumer C4. This flow of energy is indicated in FIG. 1 by a sold arrow and the reference numeral $z_{44}$.

In this example, the fifth producer P5 is connected to the first consumer C1 such that energy may flow from the fifth producer P5 to the first consumer C1. This flow of energy is indicated in FIG. 1 by a sold arrow and the reference numeral $z_{15}$.

Also, in this example the fifth producer P5 is connected to the second consumer C2 such that energy may flow from the fifth producer P5 to the second consumer C2. This flow of energy is indicated in FIG. 1 by a sold arrow and the reference numeral $z_{25}$.

Also, in this example the fifth producer P5 is connected to the fourth consumer C4 such that energy may flow from the fifth producer P5 to the fourth consumer C4. This flow of energy is indicated in FIG. 1 by a sold arrow and the reference numeral $z_{45}$.

In this example, the sixth producer P6 is connected to the second consumer C2 such that energy may flow from the sixth producer P6 to the second consumer C2. This flow of energy is indicated in FIG. 1 by a sold arrow and the reference numeral $z_{26}$.

In this example, the sixth producer P6 is connected to the third consumer C3 such that energy may flow from the sixth producer P6 to the third consumer C3. This flow of energy is indicated in FIG. 1 by a sold arrow and the reference numeral $z_{36}$.

Figure 2:
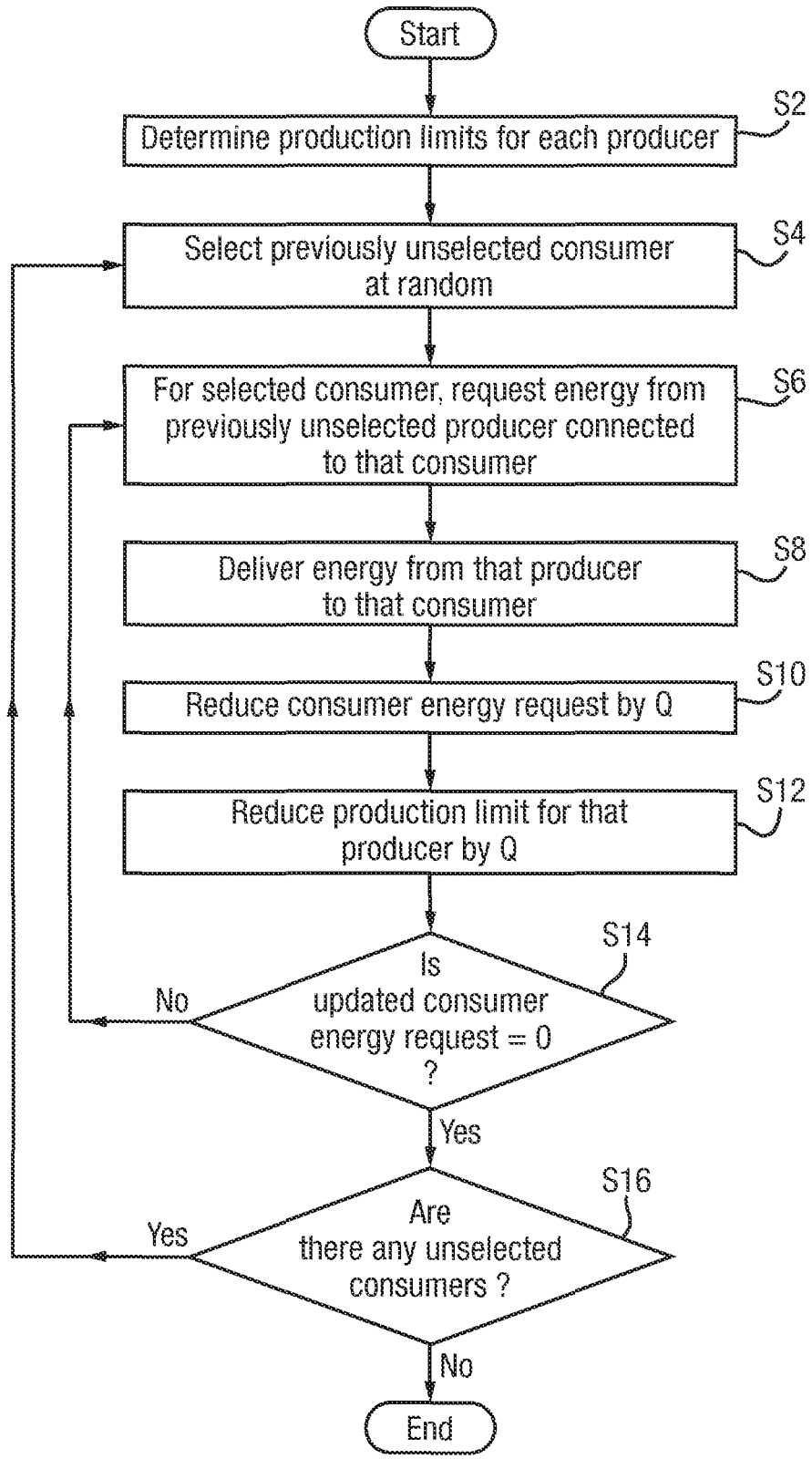
FIG. 2 is process flowchart showing certain steps of an example of an energy distribution algorithm used to distribute energy throughout the network.

FIG. 2 is process flowchart showing certain steps of a first example of an energy distribution algorithm used to distribute energy throughout the network 1. This example is useful in understanding the embodiment of the energy distribution algorithm described in more detail below with reference to FIG. 3.

In this example, the process of FIG. 2 is performed at each time step in a time period, the time period being the time period in which energy distribution within the network 1 is to be managed.

At step s2, for each of the producers P1-P6, a production limit is determined. In this embodiment, a production limit for t a producer P1-P6 is the amount of additional energy that that producer has the capacity to produce over and above any energy already being delivered.

In other words, values for the limits $L_1$-$L_6$ are determined.

At step s4, a previously unselected consumer (i.e. a consumer that has not yet been selected) is selected.

In this example, a previously unselected consumer is selected at random from a set of all previously unselected consumers. However, in other examples the consumers may be selected using a different selection method, for example the consumers may be ranked and selected in rank order, or a certain consumer may be selected with a pre-specified probability.

At step s6, for the currently selected consumer (i.e. the consumer selected at step s4), a request for energy is made by that consumer to the cheapest of the previously unselected producers to which that consumer is connected.

In this example, the cost of energy along each flow is specified in the cost vector c.

For example, if at step s4 the first consumer C1 was selected, and if the first producer P1 and the fifth producer P5 were previously unselected by that consumer, at step s6 a request for energy $R_1$ would be made by the first consumer C1 to the cheapest of the first producer P1 and the fifth producer P5.

At step s8, energy is delivered to the currently selected consumer from the producer from which the energy was requested.

In this example the amount of energy delivered to the currently selected consumer is:

$$Q=\min(R_c,L_p)$$

where:
 $R_c$ is an energy request by the currently selected consumer; and
 $L_p$ is a limit of the amount of energy that the producer from which the energy was requested can produce.

At step s10, the energy request made by the currently selected consumer, i.e. the request $R_c$, is updated by reducing the request by the amount of the energy delivered.

In other words, $R_c$ is reduced by an amount Q.

At step s12, the production limit of the currently selected producer, i.e. the limit $L_p$, is updated by reducing the production limit by the amount of the energy delivered.

In other words, $L_p$ is reduced by an amount Q.

At step s14, it is determined whether the updated energy request determined at step s10, i.e. the value of $R_c$-Q, is equal to zero.

In other words, it is determined whether or not the energy request $R_c$ of the consumer that requested the energy at step s6 has been met.

If at step s14 it is determined that $R_c-Q \geq 0$, the energy distribution algorithm proceeds back to step s6.

However, if at step s14 it is determined that $R_c-Q \leq 0$, the energy distribution algorithm proceeds to step s16.

At step s16, it is determined whether or not there are any as yet unselected consumers.

If at step s16 it is determined that there is one or more as yet unselected consumer, the energy distribution algorithm proceeds back to step s4.

However, if at step s16 it is determined that all the consumers have already been selected, the energy distribution algorithm ends.

Thus, an example of an energy distribution algorithm is provided.

What will now be described is an embodiment of an energy distribution algorithm that may be used to distribute energy throughout the network 1. The examples of energy distribution algorithms described herein (i.e. the example described above with reference to FIG. 2, and the further example described in more detail later below with reference to FIG. 4) may be used in combination with the embodiment of the energy distribution algorithm described below with reference to FIG. 3.

Figure 3:
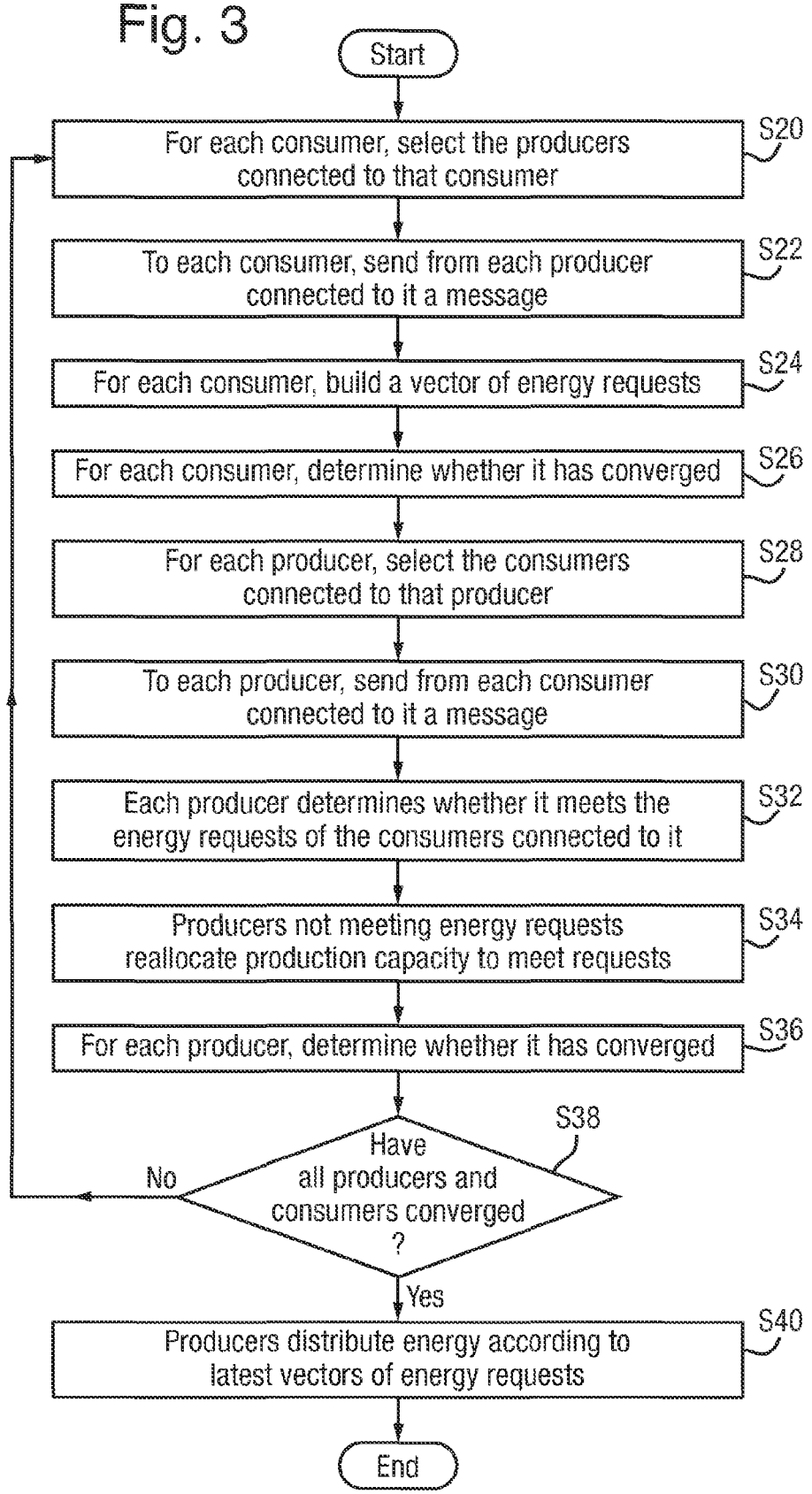
FIG. 3 is process flowchart showing certain steps of an embodiment of an energy distribution algorithm used to distribute energy throughout the network.

FIG. 3 is process flowchart showing certain steps of an embodiment of an energy distribution algorithm used to distribute energy throughout the network 1.

In this embodiment, the process of FIG. 3 is performed at each time step in a time period, the time period being the time period in which energy distribution within the network 1 is to be managed.

At step s20, for each consumer C1-C4, the producers that are connected to that consumer are selected.

At step s22, to each consumer C1-C4, a message is sent from each of the producers that are connected to that consumer.

In this embodiment, a message comprises an amount of energy allocated to that consumer by that producer. In this embodiment, initially (i.e. in a first iteration of the process of FIG. 3) the amount of energy allocated to a consumer by a connected producer is equal to the limit of the energy that can be produced by that producer divided by the number of consumers connected to that producer.

Also, in this embodiment, this message comprises a cost of the energy that can be sent to the consumer from the producer sending the message.

For example, a first iteration of the process of FIG. 3, for the first consumer C1, the first producer P1 would send a message to the first consumer C1 comprising the limit $L_1$ (because the first producer P1 is connected to one consumer) and the cost $c_{11}$. Also, the fifth producer P5 would send a message to the first consumer C1 comprising the limit $$\frac{L_5}{3}$$

(because the fifth producer P5 is connected to three consumers) and the cost $c_{15}$.

At step s24, for each consumer, a vector of energy requests is constructed using the limits and costs received by that consumer.

In this embodiment, each consumer builds its vector of energy requests as follows.

Firstly, a consumer ranks the producers connected to in order of cost (cheapest first) using the received cost values.

Secondly, a first entry for the vector of energy requests is created. This is a request from the consumer to the cheapest connected producer for an amount of energy. This amount of energy is equal to the maximum of a total amount of energy needed by the consumer and the received limit value sent to the consumer by that producer.

If the total amount of energy requested in the vector of energy requests equals the total amount of energy needed by the consumer, the vector of energy requests is considered complete.

However, if the total amount of energy requested in the vector of energy requests is less than the total amount of energy needed by the consumer, the total amount of energy needed by the consumer is reduced by the amount that can be provided by the cheapest connected producer, and a second entry for vector of energy requests (i.e. a request from the consumer to the second cheapest connected producer for an amount of energy) is created, and so on.

This process is continued until the vector of energy requests is considered complete.

At step s26, for each consumer C1-C4, it is determined whether that consumer has "converged".

In this embodiment, a consumer C1-C4 is determined to have converged if the total amount of energy needed by the consumer is less than or equal to the sum of the limit values sent to that consumer by the producers connected to it.

At step s28, for each producer P1-P6, the consumers that are connected to that producer are selected.

At step s30, to each producer P1-P6, a message is sent from each of the consumers that are connected to that producer.

In this embodiment, this message comprises the vector of energy requests created at step s24 by the consumer sending the message.

At step s32, each producer P1-P6 determines, for each consumer connected to that producer (i.e. each consumer that sends that producer its vector of energy requests at step s30), whether the amount of energy requested by that consumer (as specified in that consumer's vector of energy requests) is greater than the current amount of energy allocated to that consumer by that producer.

In this embodiment, step s34 (described in more detail later below) is only performed for producers P1-P6 for which it is determined that, for one or more of the consumers connected to that producer, the amount of energy requested by that consumer is greater than the current amount of energy allocated to that consumer by that producer.

In this embodiment, for producers P1-P6 for which it is determined that, for each of the consumers connected to that producer, the amount of energy requested by that consumer is less than or equal to the current amount of energy allocated to that consumer by that producer, step s34 is not performed and the process proceeds to step s36.

At step s34, the relevant producers P1-P6 (i.e. the producers for which it is determined that at step s32, for a consumer connected to that producer, the amount of energy requested by that consumer is greater than the current amount of energy allocated to that consumer by that producer) reallocate the total amount of energy that they can produce amongst the connected consumers so as to satisfy each of the respective energy requests from each of the respective consumers connected to that producer.

Once each relevant producer has reallocated its energy production capacity so as to satisfy each of the received energy requests, the process proceeds to step s36.

In this embodiment, step s34 is performed using a conventional algorithm.

At step s36, for each producer P1-P6, it is determined whether that producer has "converged".

In this embodiment, a producer P1-P6 is determined to have converged if either:
- it was determined at step s32 that, for each of the consumers connected to that producer, the amount of energy requested by that consumer is less than or equal to the current amount of energy allocated to that consumer by that producer; or
- at step s34 that producer reallocated the energy that it can produce to each consumer connected to that producer such that the respective energy requests from each respective consumer connected to that producer were satisfied.

At step s38, it is determined whether or not all consumers C1-C4 and all producers P1-P6 have "converged".

If at step s38 it is determined that not all consumers C1-C4 and producers P1-P6 have converged, the process proceeds (with the latest allocations of production capacity assigned by the producers P1-P6 to their respective connected consumers C1-C4 being preserved) to step s20.

However, if at step s38 it is determined that all consumers C1-C4 and producers P1-P6 have converged, the process proceeds to step s40.

At step s40, the producers P1-P6 distribute energy throughout the network according to the vectors of energy requests received by each producer from each the consumer(s) connected to that producer.

Thus, an embodiment of an energy distribution algorithm used to distribute energy throughout the network 1 is provided.

In this embodiment a dialogue between producers and consumers is advantageously exploited to facilitate efficient energy distribution. Consumers C1-C4 request energy from the producers P1-P6 (from the cheapest producer first), and the producers P1-P6 aggregate these requests and decide whether they can fulfil them all. If not, the producers P1-P6 redistribute their capacities to best match all requests. The consumers C1-C4 then modify their requests in light of these updates.

The following information and notation is useful in the understanding of a second example of an energy distribution algorithm described in more detail later below with reference to FIG. 4.

In this example, the distribution of energy throughout the network 1 is a Linear Programming (LP) problem. The LP problem is that of finding $z_0$, where $z_0$ is a minimum total cost of distributing energy throughout the network 1.

In this example, $$z_0 = \operatorname*{argmin}_z c^T z$$

subject to $$Az \leq b$$

where:
- $z_0$ is a value indicative of the minimum total cost of distributing energy throughout the network 1 according to the schedule z;
- z is a vector of energy flows within the network 1, i.e. $z = (z_{11}, z_{15}, z_{22}, z_{25}, z_{26}, z_{33}, z_{36}, z_{44}, z_{45})^T$

- c is a vector of costs associated with the energy flows within the network, i.e. $c = (c_{11}, c_{15}, c_{22}, c_{25}, c_{26}, c_{33}, c_{36}, c_{44}, c_{45})^T$ where $c_{ij}$ is the unit cost of the flow $z_{ij}$; and
- the matrix A and the vector b capture the requirements that (i) the consumers C1-C4 have their energy needs fulfilled, (ii) the producers P1-P6 are unable to provide more energy than they are capable of producing and (iii) the flows $z_{ij}$ are unidirectional (from producers to consumers).

In this example the matrix A and the vector b are:

$$A = \begin{bmatrix} -1 & -1 & 0 & 0 & 0 & 0 & 0 & 0 & 0 \\ 0 & 0 & -1 & -1 & -1 & 0 & 0 & 0 & 0 \\ 0 & 0 & 0 & 0 & 0 & -1 & -1 & 0 & 0 \\ 0 & 0 & 0 & 0 & 0 & 0 & 0 & -1 & -1 \\ 1 & 0 & 0 & 0 & 0 & 0 & 0 & 0 & 0 \\ 0 & 0 & 1 & 0 & 0 & 0 & 0 & 0 & 0 \\ 0 & 0 & 0 & 0 & 0 & 1 & 0 & 0 & 0 \\ 0 & 0 & 0 & 0 & 0 & 0 & 0 & 1 & 0 \\ 0 & 1 & 0 & 1 & 0 & 0 & 0 & 0 & 1 \\ 0 & 0 & 0 & 0 & 1 & 0 & 1 & 0 & 0 \\ -1 & 0 & 0 & 0 & 0 & 0 & 0 & 0 & 0 \\ 0 & -1 & 0 & 0 & 0 & 0 & 0 & 0 & 0 \\ 0 & 0 & -1 & 0 & 0 & 0 & 0 & 0 & 0 \\ 0 & 0 & 0 & -1 & 0 & 0 & 0 & 0 & 0 \\ 0 & 0 & 0 & 0 & -1 & 0 & 0 & 0 & 0 \\ 0 & 0 & 0 & 0 & 0 & -1 & 0 & 0 & 0 \\ 0 & 0 & 0 & 0 & 0 & 0 & -1 & 0 & 0 \\ 0 & 0 & 0 & 0 & 0 & 0 & 0 & -1 & 0 \\ 0 & 0 & 0 & 0 & 0 & 0 & 0 & 0 & -1 \end{bmatrix} \quad b = \begin{bmatrix} -R_1 \\ -R_2 \\ -R_3 \\ -R_4 \\ L_1 \\ L_2 \\ L_3 \\ L_4 \\ L_5 \\ L_6 \\ 0 \\ 0 \\ 0 \\ 0 \\ 0 \\ 0 \\ 0 \\ 0 \\ 0 \end{bmatrix}$$

where:
- $R_i$ is an energy request by the ith consumer, i.e. an amount of energy that is required and requested by the ith consumer; and
- $L_i$ is a limit of the amount of energy that the ith producer can produce.

As an example, the first row of the constraint expression $Az \leq b$ gives:

$$-z_{11} - z_{15} \leq -R_1 \Rightarrow z_{11} + z_{15} \geq R_1$$

In other words, the flow of energy into the first consumer C1 (i.e. $z_{11} + z_{15}$) is greater than or equal to the amount of energy requested by the first consumer C1 (i.e. $R_1$). Thus, the first consumer C1 has its energy requirements met.

Similarly, the fifth row of the constraint expression $Az \leq b$ gives:

$$z_{11} \leq L_1$$

In other words, the flow of energy from the first producer P1 (i.e. $z_{11}$) is less than or equal to the amount that producer P1 is able to produce.

Similarly, the eleventh row of the constraint expression $Az \leq b$ gives:

$$-z_{11} \leq 0 \Rightarrow z_{11} \geq 0$$

In other words, the flow of energy from the first producer P1 to the first consumer C1 is zero or positive (i.e. one-way).

In general, the matrix A and the vector b are expressed as follows:

$$A = \begin{bmatrix} A_c \\ A_p \\ I \end{bmatrix}, \quad b = \begin{bmatrix} -R \\ L \\ 0 \end{bmatrix}$$

where:
- $A_c$ is an incidence matrix representing the correspondence between a particular consumer and each energy flow into that consumer. In this embodiment, the elements of $A_c$ are negative. The matrix $A_c$ is of size $N_c \times N_f$, where $N_c$ is the total number of consumers in the network, and $N_f$ is the total number of energy flows in the network;
- $A_p$ is an incidence matrix representing the correspondence between a particular producer and each energy flow from that producer. The matrix $A_p$ is of size $N_p \times N_f$, where $N_p$ is the total number of producers in the network;
- $I$ is a negative of an $N_f \times N_f$ identity matrix;
- $R$ is a vector of the consumer requests $R_i$;
- $L$ is a vector of the producer limits $L_i$; and
- $0$ is a vector of zeros of size $N_f$.

FIG. 4 is process flowchart showing certain steps of a second example of a further energy distribution algorithm used to distribute energy throughout the network 1.

In this example, the process of FIG. 4 is performed at each time step in a time period, the time period being the time period in which energy distribution within the network 1 is to be managed.

At step s50, each node in the network 1 (i.e. for each consumer C1-C4 and each producer P1-P6) creates a version for itself of the following matrices and vectors: $A_c$, $A_p$, R, L and c.

In this example, the elements of the matrices and vectors $A_c$, $A_p$, R, L and c that are created by a node are initialised depending on the nature of the node creating them.

At step s52, for each node in the network 1, the nodes connected to that node are selected.

At step s54, for each node in the network 1, the current elements of the matrices and vectors $A_c$, $A_p$, R, L and c of that node are updated using the current elements of the matrices/vectors $A_c$, $A_p$, R, L and c of each of the selected nodes that are connected to that node.

At step s56, each node in the network 1 constructs its own version of the matrix A and the vectors b and c using the current matrices and vectors $A_c$, $A_p$, R, L and c of that node.

In this example, the matrix A and the vector b are constructed according to the following formulae:

$$A = \begin{bmatrix} A_c \\ A_p \\ I \end{bmatrix}, \quad b = \begin{bmatrix} -R \\ L \\ 0 \end{bmatrix}$$

At step s58, each node in the network 1 calculates a value for $z_0$, where:

$$z_0 = \operatorname*{argmin}_{z} c^T z$$

and subject to $$Az \leq b$$

In this example, step s58 is performed using the Simplex method described in "*Linear Programming and Extensions*", Dantzig G. B. 1963, Princeton, N.J.: Princeton University Press which is incorporated herein by reference.

At step s60, it is determined whether or not, for any node, the value for $z_0$ determined by that node is different to the value for $z_0$ determined by a different node that is connected to that node.

In other words, it is determined whether the determined values for $z_0$ have converged.

In other examples, step s60 is performed using a different method. For example, it may be determined whether or not the matrix A and the vector b have substantially stopped changing (i.e. they have converged). If the matrix A and the vector b have converged, the optimal $z_0$ has been attained.

If at step s60 it is determined that, for any node, the value for $z_0$ determined by that node is different to the value for $z_0$ determined by a different node that is connected to that node, the process proceeds to back to step s52.

However, if at step s60 it is determined that, for any node, the value for $z_0$ determined by that node is not different to the minimum value for $z_0$ determined by a different node that is connected to that node (i.e. the values for $z_0$ determined by each of the node are equal), the process proceeds to step s62.

At step s62, each node in the network 1 determines a vector of energy flows z depending on the value for $z_0$.

In other words, each node determines/identifies the vector z that satisfies:

$$z_0 = c^T z$$

At step s64, the producers P1-P6 distribute energy to the consumers C1-C4 according to the vector of energy flows z determined at step s62.

Thus, a second example of a further energy distribution algorithm used to distribute energy throughout the network 1 is provided.

The above described energy distribution algorithms advantageously provide methods for distributing energy (or some other asset) throughout a network such that a cost incurred by the consumers in the network tends to be reduced or minimised (compared to conventional energy distribution algorithms). Such a cost may be a monetary cost or other metric (e.g. a value indicative of the risk in delivering an asset from a producer to a consumer).

Relatively efficient algorithms for managing the distribution of energy (or some other asset) within a network are provided.

The above described energy distribution algorithms advantageously provide a decentralised method for distributing energy within a network. Advantages for a decentralised approach as opposed to a centralised approach include those described in "*Information Theory, Inference and Learning Algorithms*", McKay, D. J. C. 2003, Cambridge University Press, 241-247, which is incorporated herein by reference. Furthermore, as a network becomes large, centralized management of energy distribution tends to become more difficult.

In the above described embodiments of the energy distribution algorithm, the sharing of resources (i.e. the energy sharing of produced energy amongst the consumers) advantageously tends to reduce the overall cost to the network as a whole of provide the consumers with energy.

Further advantages that tend to be provided by the above described embodiments of an energy distribution algorithm include robustness to node loss, scalability and computational complexity.

Apparatus, including one or more processors, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowchart of FIGS. 2 to 4 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the energy distribution algorithm is implemented for the network described above with reference to FIG. 1. However, in other embodiments the energy distribution algorithm is implemented for a different network. For example, in other embodiments the energy distribution algorithm is implemented for a network that has a different number of consumers and/or producers to the network described above and shown in FIG. 1. In other embodiments, the energy distribution algorithm is implemented for a network in which the flows of energy within the network are different to those within the network described above and shown in FIG. 1.

In the above embodiments, the network in which the energy distribution algorithm is implemented comprises producers and consumers of energy. The producers and consumers are linked by energy flows, as described in more detail above with reference to FIG. 1. However, in other embodiments the network comprises one or more different type of entity in addition to or instead of any of the consumers/producers. For example in other embodiments, the network comprises one or more batteries.

The presence of batteries in the distributed network may be accounted for in the above described first example of an energy distribution algorithm by treating each of those batteries as producers, i.e. the batteries are discharged if it is cost-effective to do so. The batteries may be re-charged if there is an energy surplus remaining after all consumers have been satisfied, subject to a user-set maximum cost to re-charge.

The presence of batteries in the distributed network may be accounted for in the above described embodiment of an energy distribution algorithm by treating each of those batteries as both a producer and a consumer. Thus, in the first example the batteries receive and pass messages to all neighbours. In this example, a battery connected to a consumer "appears" to that consumer as a producer. Likewise, a battery connected to a producer "appears" to that producer as a consumer. In this example, the state of a battery is determined upon convergence of the algorithm as either charging (i.e. a consumer) or discharging (i.e. a producer).

The presence of batteries in the distributed network may be accounted for in the above described second example of an energy distribution algorithm by performing the algorithm $2^n$ times where n is the number of batteries. In other words, the algorithm is performed for each of the different states of the network, with each battery being treated as a consumer or a producer.

In other embodiments, lower-cost energy is bought from a grid and stored (in batteries), or sold as surplus energy back to the grid.

The invention claimed is:

1. A method of distributing a resource through a network, the resource being electrical power, the network comprising a plurality of consumer units and a plurality of provider units, each consumer unit being connected to one or more provider units in the network, each consumer unit being a user of the resource and being associated with a desired resource amount of the resource, each provider unit being a provider of the resource and being associated with a resource production capacity of the resource, the method comprising:

for each provider unit, allocating a portion of the resource production capacity of that provider unit to each of the consumer units to which that provider unit is connected, thereby providing a current production allocation for each provider unit;

performing one or more times steps (a) to (c), wherein
step (a) comprises, for each consumer unit, generating a vector comprising one or more resource requests, thereby providing a current vector for each consumer unit, each resource request being a request for an amount of the resource to be delivered to that consumer unit from a provider unit connected to that consumer unit from among the plurality of provider units, and each resource request being dependent on the current production allocation of that provider unit;

step (b) comprises, for each provider unit, determining whether the current production allocation of that provider unit satisfies the resource requests made of that provider unit in each of the current vectors; and step (c) comprises, for each provider unit for which it is determined that the current production allocation does not satisfy the resource requests made of that provider unit in each of the current vectors, updating the current production allocation for that provider unit; and from each provider unit and dependent on the current production allocation of that provider unit, delivering an amount of the resource to a consumer unit connected to that provider unit from among the plurality of consumer units, wherein the step of, for each consumer unit, generating the vector comprising the one or more resource requests comprises, one or more times, performing steps (d) to (e), step (d) comprises selecting a previously unselected provider unit that is connected to that consumer unit from among the plurality of provider units, thereby providing a currently selected provider unit, step (e) comprises, generating a resource request of the one or more resource requests, the generated resource request being a request for an amount of the resource to be delivered to that consumer unit from the currently selected provider unit, the amount of the resource requested in the generated resource request of step (e) is substantially equal to a minimum of a first value and a second value, the first value is the resource production capacity of the currently selected provider unit that is allocated to that consumer unit, and the second value is a difference between the desired resource amount associated with that consumer unit and a total amount of the resource requested in all other of the resource requests in the current vector provided for that consumer unit.

2. The method according to claim 1, wherein steps (a) to (c) are performed until, at step (c), it is determined that, for each provider unit, the current production allocation of that provider unit satisfies the resource requests made of that provider unit in each of the current vectors.

3. The method according to claim 1, wherein each resource request for each consumer unit is further dependent on the desired resource amount associated with that consumer unit.

4. The method according to claim 1, wherein
in step (d), each provider unit that is connected to that consumer unit is associated with a cost of providing the resource to that consumer unit, and
step (d) further comprises selecting, as the currently selected provided unit, a previously unselected provider unit associated with a lowest cost of the costs associated with the previously unselected provider units that are connected to that consumer unit.

5. The method according to claim 1, wherein step (a) further comprises, for each provider unit, sending to each of the consumer units to which that provider unit is connected, an indication of the resource production capacity allocated to that consumer unit by that provider unit.

6. The method according to claim 1, wherein step (b) further comprises, for each consumer unit, sending to each of the provider units to which that consumer unit is connected, the current vector provided for that consumer unit.

7. The method according to claim 1, wherein one or more provider units in the plurality of provider units is an electrical energy grid.

8. The method according to claim 1, wherein one or more provider units in the plurality of provider units is a renewable energy source.

9. The method of distributing a resource through a network during a time period, the time period comprising a plurality of time steps, the method comprising, at each time step, performing a method according to claim 1.

10. An apparatus for distributing a resource through a network, the resource being electrical power, the network comprising a plurality of consumer units and a plurality of provider units, each consumer unit being connected to one or more provider units in the network, each consumer unit being a user of the resource and being associated with a desired resource amount of the resource, each provider unit being a provider of the resource and being associated with a resource production capacity of the resource, the apparatus comprising:
one or more processors arranged to:
for each provider unit, allocate a portion of the resource production capacity of that provider unit to each of the consumer units to which that provider unit is connected, thereby providing a current production allocation for each provider unit;
one or more times, perform a process comprising:
for each consumer unit, generating a vector comprising one or more resource requests, thereby providing a current vector for each consumer unit, each resource request being a request for an amount of the resource to be delivered to that consumer unit from a provider unit connected to that consumer unit from among the plurality of provider units, and each resource request being dependent on the current production allocation of that provider unit;
for each provider unit, determining whether the current production allocation of that provider unit satisfies the resource requests made of that provider unit in each of the current vectors; and
for each provider unit for which it is determined that the current production allocation does not satisfy the resource requests made of that provider unit in each of the current vectors, updating the current production allocation for that provider unit; and
an electrical energy grid for, from each provider unit and dependent on the current production allocation of that provider unit, delivering an amount of the resource to a consumer unit connected to that provider unit from among the plurality of consumer units, wherein
the generating of the vector comprising the one or more resource requests for each consumer unit comprises performing, one or more times:
selecting a previously unselected provider unit that is connected to that consumer unit from among the plurality of provider units, thereby providing a currently selected provider unit; and
generating a resource request of the one or more resource requests, the generated resource request being a request for an amount of the resource to be delivered to that consumer unit from the currently selected provider unit,
the amount of the resource requested in the generated resource request is substantially equal to a minimum of a first value and a second value,
the first value is the resource production capacity of the currently selected provider unit that is allocated to that consumer unit, and
the second value is a difference between the desired resource amount associated with that consumer unit and a total amount of the resource requested in all other of the resource requests in the current vector provided for that consumer unit.

11. One or more non-transient machine readable storage mediums encoded with instructions that when executed by one or more processors cause a method to be carried out, the method for distributing a resource through a network, the resource being electrical power, the network comprising a plurality of consumer units and a plurality of provider units, each consumer unit being connected to one or more provider units in the network, each consumer unit being a user of the resource and being associated with a desired resource amount of the resource, each provider unit being a provider of the resource and being associated with a resource production capacity of the resource, the method comprising:
for each provider unit, allocating a portion of the resource production capacity of that provider unit to each of the consumer units to which that provider unit is connected, thereby providing a current production allocation for each provider unit;
performing one or more times steps (a) to (c), wherein
step (a) comprises, for each consumer unit, generating a vector comprising one or more resource requests, thereby providing a current vector for each consumer unit, each resource request being a request for an amount of the resource to be delivered to that consumer unit from a provider unit connected to that consumer unit from among the plurality of provider units, and each resource request being dependent on the current production allocation of that provider unit;

step (b) comprises, for each provider unit, determining whether the current production allocation of that provider unit satisfies the resource requests made of that provider unit in each of the current vectors; and step (c) comprises, for each provider unit for which it is determined that the current production allocation does not satisfy the resource requests made of that provider unit in each of the current vectors, updating the current production allocation for that provider unit; and from each provider unit and dependent on the current production allocation of that provider unit, delivering an amount of the resource to a consumer unit connected to that provider unit from among the plurality of consumer units, wherein the step of, for each consumer unit, generating the vector comprising the one or more resource requests comprises, one or more times, performing steps (d) to (e), step (d) comprises selecting a previously unselected provider unit that is connected to that consumer unit from among the plurality of provider units, thereby providing a currently selected provider unit, step (e) comprises, generating a resource request of the one or more resource requests, the generated resource request being a request for an amount of the resource to be delivered to that consumer unit from the currently selected provider unit, the amount of the resource requested in the generated resource request of step (e) is substantially equal to a minimum of a first value and a second value, the first value is the resource production capacity of the currently selected provider unit that is allocated to that consumer unit, and the second value is a difference between the desired resource amount associated with that consumer unit and a total amount of the resource requested in all other of the resource requests in the current vector provided for that consumer unit.

12. The one or more non-transient machine readable storage mediums according to claim 11, wherein steps (a) to (c) are performed until, at step (c), it is determined that, for each provider unit, the current production allocation of that provider unit satisfies the requests made of that provider unit in each of the current vectors.

13. The one or more non-transient machine readable storage mediums according to claim 11, wherein each resource request for each consumer unit is further dependent on the desired resource amount associated with that consumer unit.

14. The one or more non-transient machine readable storage mediums according to claim 11, wherein in step (d), each provider unit that is connected to that consumer unit is associated with a cost of providing the resource to that consumer unit, and step (d) further comprises selecting, as the currently selected provided unit, a previously unselected provider unit associated with a lowest cost of the costs associated with the previously unselected provider units that are connected to that consumer unit.

15. The one or more non-transient machine readable storage mediums according to claim 11, wherein step (a) further comprises, for each provider unit, sending to each of the consumer units to which that provider unit is connected, an indication of the resource production capacity allocated to that consumer unit by that provider unit.

16. The one or more non-transient machine readable storage mediums according to claim 11, wherein step (b) further comprises, for each consumer unit, sending to each of the provider units to which that consumer unit is connected, the current vector provided for that consumer unit.

* * * * *